United States Patent

[11] 3,619,059

| [72] | Inventors | Peter Muller<br>Ruhpolding;<br>Ernst Guilino, Munchen, both of Germany |
|---|---|---|
| [21] | Appl. No. | 848,002 |
| [22] | Filed | Aug. 6, 1969 |
| [45] | Patented | Nov. 9, 1971 |
| [73] | Assignee | Institut fur Plasmaphysik G.m.b.H.<br>Munich, Germany |
| [32] | Priority | Aug. 7, 1968 |
| [33] | | Germany |
| [31] | | P 17 97 032.0 |

[54] COLOR TEMPERATURE MEASURING PROCESS AND APPARATUS
15 Claims, 6 Drawing Figs.

[52] U.S. Cl. .................................................. 356/45, 250/226, 356/88
[51] Int. Cl. ............................................. G01j 5/60, G01j 3/42
[50] Field of Search ............................................ 356/43, 50, 88; 250/210, 214, 226, 229; 73/355

[56] References Cited
UNITED STATES PATENTS

| 2,302,554 | 11/1942 | Kingsbury | 356/43 |
| 2,652,743 | 9/1953 | Morrow | 250/210 |
| 2,674,155 | 4/1954 | Gibson | 250/229 |
| 3,327,124 | 6/1967 | Plum | 250/210 |
| 3,454,775 | 7/1969 | Gibbs | 250/229 |
| 3,506,358 | 4/1970 | Baba et al. | 356/88 |
| 3,522,739 | 8/1970 | Coor et al. | 250/214 |

*Primary Examiner* — Ronald L. Wibert
*Assistant Examiner* — J. P. McGraw
*Attorney* — Spencer & Kaye

ABSTRACT: The color temperature of the radiating body is measured by separately measuring photoelectrically two different wavelength ranges of a beam emanating from the body, while the intensity of the beam is adjusted by an attenuating device so that the two different wavelength ranges are affected substantially the same and one of the wavelength ranges is maintained at a predetermined intensity.

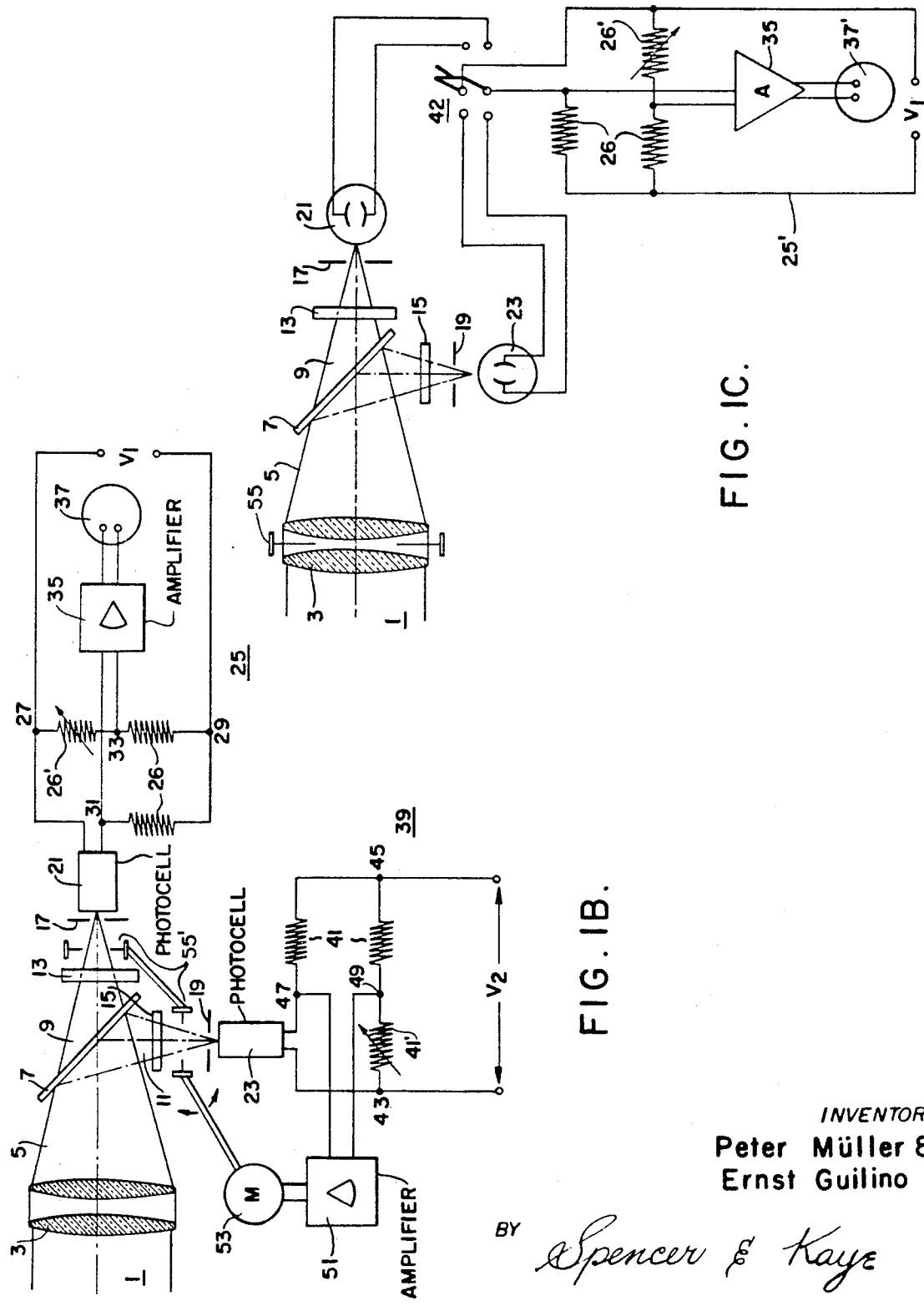

INVENTORS
Peter Müller &
Ernst Guilino

COLOR TEMPERATURE MEASURING PROCESS AND APPARATUS

BACKGROUND OF THE INVENTION

The "color temperature" of an optically radiating body is the temperature (which deviates from the true temperature of the radiating body) at which a "black body" (emission capability = 1) is of the same color as the observed radiating body.

It is known to determine the color temperature of a temperature radiator from the ratio or quotient of the radiation energy in two different wavelength ranges of the radiation emitted by the radiator. It is further known to determine the color temperature by using two photocells with highly selective properties whose sensitivity ranges are limited to two different wavelength ranges, if necessary with the aid of filters.

The determination of the color temperature of a temperature radiator from the ratio of the radiated energy of two wavelength ranges simultaneously emitted from the same location has the advantage that the emission capability (gray factor) of the temperature radiator is not incorporated in the measuring result as long as it has the same value in the two wavelength ranges employed for all temperatures to be measured.

The error resulting from the assumption that the emission capability is identical in the wavelength ranges employed for all temperatures can generally be reduced to a minimum by suitable selection of the wavelength ranges.

In processes for color temperature determination in which the ratio of the radiated energy of two wavelength ranges of the emitted radiation is determined photoelectrically, however, considerable difficulties arise in practice due to the fact that so far there exist no radiation-sensitive photoelectric devices, such as photocells, photoresistors, semiconductor photodiodes or photoelectron multipliers, which exhibit a linear characteristic in the required intensity range. Thus, it has been necessary in the past to take relatively complicated measures to avoid this drawback in the available photoelectric devices.

SUMMARY OF THE INVENTION

It is the main object of the present invention to eliminate this drawback.

This object as well as others is achieved, according to the present invention, by a photoelectric process to determine color temperature in which the ratio of the radiated energy in two different wavelength ranges of a beam emitted from an object to be measured is photoelectrically measured. The intensity of the radiated beam is so adjusted, by means of an attenuating device which influences the radiation in both wavelength ranges at leas substantially to the same extent, that the radiated energy in the one wavelength range of the radiated beam has a given value behind the attenuation device. Then, without changing the setting of the attenuating device, the radiated energy in the other wavelength range of the radiated beam is measured behind the attenuation device, this measured value being a measure for the desired color temperature.

This process can be accomplished with color temperature measuring instruments which are simple in construction and which permit the utilization of inexpensive photoelectric devices, such as semiconductor photoresistors, even though these might have strongly nonlinear characteristics which vary substantially between instrument and instrument. At the same time, however, high measuring accuracy is assured.

In the simplest case such a color temperature measuring instrument contains an adjustable attenuator device disposed in the path of the radiated beam between the object to be measured and a photoelectric device as well as two narrowband color filters, particularly interference filters which can be selectively placed in the path of the radiated beam.

The color temperature measuring device, however, may also contain an arrangement to divide the radiated beam emitted from the object to be measured into two partial beams each of which includes the radiation of one of the two wavelength ranges. The intensities of the partial beams are measured consecutively by a photoelectric device or by two photoelectrical devices. The attenuator device can act either on the undivided beam or identically on the two partial beams. The arrangement to divide the beams may be a prism, a diffraction screen, one or more dichroic mirrors or a neutral-color radiation divider (partially permeably silvered mirror) which are connected behind the color filter.

The measuring accuracy and the response speed of a color temperature measuring instrument of the above-mentioned type may be improved by feeding the output signal controlling the attenuation device also into a control circuit which controls the sensitivity of the photoelectric measuring arrangement with respect to the radiation in the two wavelength ranges in such a manner and in the same sense that the output signal controlling the attenuation device is kept constant, except for the error caused by the control deviation of the control circuit.

This measure achieves a substantial increase in accuracy with little expense since the rough control is accomplished by the adjustment of the attenuating device which can be accomplished with simple means whereas the fine control is effected by means of the control circuit which influences the sensitivity of the photoelectric measuring device. A further advantage results from the fact that the control circuit which influences the sensitivity of the photoelectric measuring device responds faster by orders of magnitude than the usually manually adjusted attenuating device so that an overload of the photoelectric measuring device which may contain secondary electron multipliers, for example, is eliminated. Even temporary overloads of photoelectric devices can cause fatigue phenomena which substantially inhibit the measuring accuracy and measuring speed.

BRIEF DESCRIPTION OF THE DRAWINGS

FIG. 1B is a schematic view of a modified embodiment of the present invention.

FIG. 1C is a schematic view of another modified embodiment of the particular invention.

DESCRIPTION OF THE PREFERRED EMBODIMENTS

Figure 1A:
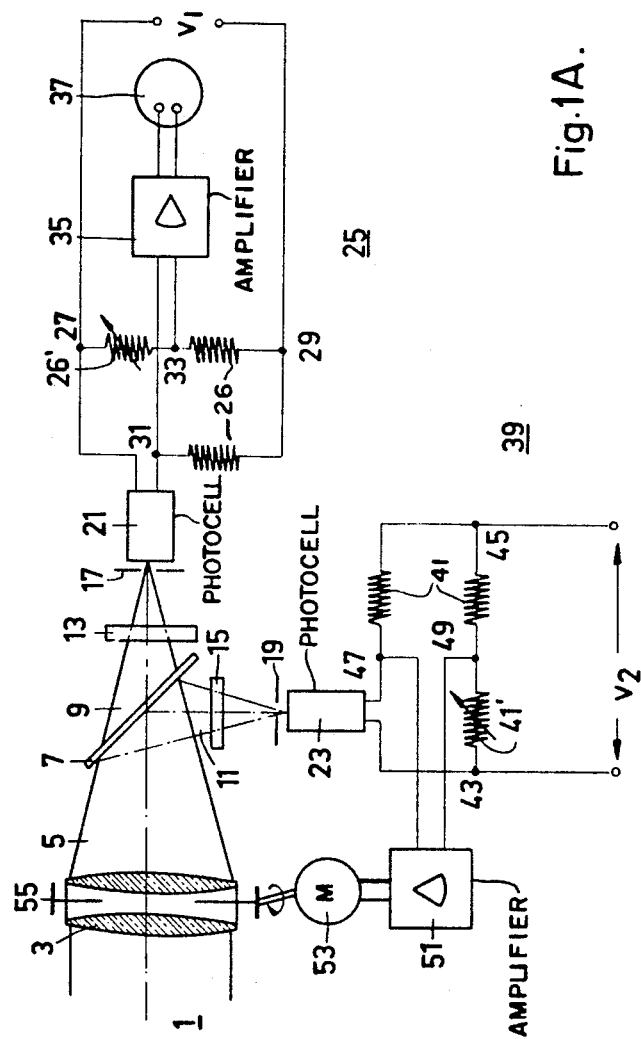
FIG. 1A is a schematic view of one embodiment of the present invention.

In all the figures corresponding elements are indicated by the same reference numerals.

The radiation emitted by the object to be measured is collimated, for example, by a telescope (not shown) and enters as a beam of parallel rays 1 into a lens 3 of the photoelectric pyrometer. The converging beam 5 is divided by a semipermeable mirror 7 into two partial beams 9, 11 from which filters 13, 15 filter out two different, preferably closely limited wavelength ranges. The portions of beams 9, 11 which pass through the filters continue through baffles 17, 19, which are disposed approximately in the focal plane of lens 3, onto photoresistors 21 or 23 (e.g., semiconductor photoresistors), respectively.

Photoresistor 21 is disposed in the arm of a bridge 25 which contains three further resistors 26, 26, 26' of which at least one is a variable resistor 26' in order to maintain the bridge in the sensitive range (all resistor values being approximately equal). A voltage source $V_1$ is connected to the one bridge diagonal 27, 29, and amplifier 35, to which is connected a measuring instrument 37, is connected to the other bridge diagonal 31, 33.

The photoresistor 23 also forms an arm of a bridge 39 which contains three further resistors 41, 41, 41' of which at least one is a variable resistor 41'. The bridge diagonal 43, 45 is fed by a voltage source $V_2$; an amplifier 51 and a servometer 53 connected thereto are connected to the other bridge diagonal 47, 49. The servomotor 53 serves to drive a mechanically adjustable member or aperture diaphragm 55 which serves as a neutral color-attenuation device in lens 3 through which the light intensity passing through the lens may be controlled.

In operation, the aperture 55, e.g., an iris diaphragm, is adjusted by motor 53 until the bridge 39 is balanced, i.e., the voltage at the bridge diagonal 47, 49 has become zero. The radiation energy falling onto photoresistor 23 thus always has the same value; which value is independent of the temperature of the measuring object and can be set by means of variable resistor 41' so that photoresistor 23 operates in the optimum range where no fatigue need be feared. Since photoresistor 23 is always charged with the same radiation energy, the shape of its characteristics curve is insignificant. The voltage $V_2$ need not be stabilized since bridge 39 operates in a balanced state practically all the time.

The intensity of the beam falling onto photoresistor 21 is also controlled by aperture 55. When bridge 25 is fed with a stabilized voltage, the voltage at the diagonal 31, 33 can be indicated directly by measuring instrument 37; this voltage having been amplified if necessary. In this case the measuring instrument 37 is calibrated in color temperature degrees. Bridge 25, however, can also be balanced to zero by means of resistor 26'; the color temperature then being a function of the setting of resistor 26'.

When unstabilized voltages are used, both bridges 25 and 39 are preferably fed from the same voltage source.

Figure 2:
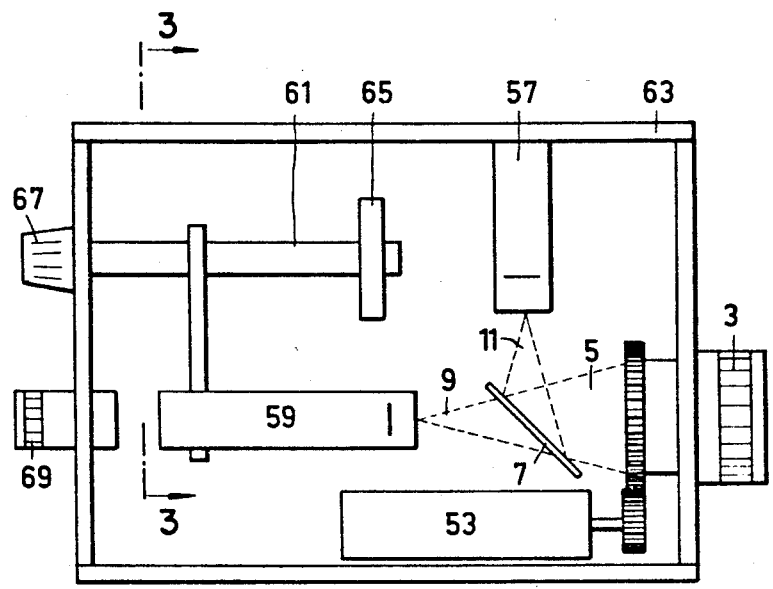
FIG. 2 is a simplified top view of a practical embodiment of the embodiment of the present invention shown in FIG. 1A.
Figure 3:
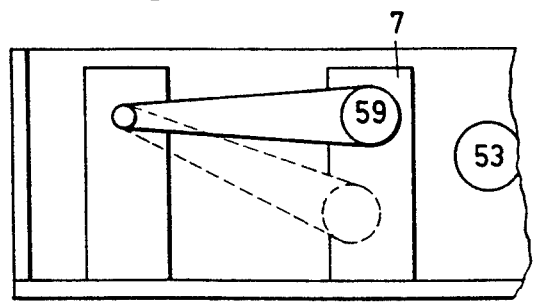
FIG. 3 is a sectional view taken substantially along the plane defined by line 3—3 of FIG. 2.

FIGS. 2 and 3 show, somewhat simplified, a practical embodiment of the measuring instrument schematically illustrated in FIG. 1A. The same reference numerals were used for the same components so that a detailed explanation is not necessary. The color filter 15, the baffle 19 and the photoresistor 23 of FIG. 1A are arranged in a tube 57; color filter 13, baffle 17 and photoresistor 21 of FIG. 1A are disposed in a tube 59. Tube 59 is pivotally mounted on a shaft 61, which is disposed in a lightproof housing 63 enclosing the instrument by means of a support 65 and can be manually turned by means of a knob 67. Tube 59 can thus be moved out of the path of beam 9 (shown in FIG. 3 by dashed lines), which beam then falls into an ocular 69 which contains a reticle or the like. When the tube 59 is moved out of the beam path, the instrument can be easily aimed at a certain point on the object to be measured by sighting through the ocular 69 and the lens 3 (and possibly a further telescope, not shown, which may be a structural unit with the lens 3).

The described embodiment may be modified in a variety of ways without exceeding the scope of the present invention. Instead of controlling the undivided light beam by means of aperture 55 as shown in FIG. 1A, it is possible, as shown in FIG. 1B, to provide an aperture diaphragm 55' in each of the paths of the partial beam 9, 11, said diaphragms being synchronously operated, or a single aperture diaphragm large enough to influence both partial beams simultaneously could be used. Instead of aperture diaphragms it would be possible to use wedge filters, polarizers which are rotatable with respect to one another, or other well-known attenuators which, however, have the drawback, when compared with aperture diaphragms, that they are not usually entirely neutral to color. Instead of the semipermeable mirror 7 it is possible to use an interference filter to divide the impinging light into two beams. The arrangement of light divider 7 and color filters 13 and 15 may be replaced by a prism or refraction grid with radiation-sensitive devices disposed at a suitable point.

Instead of balancing bridge 25 by means of resistor 26', it would be possible to provide an additional attenuator, e.g., an aperture diaphragm, in the path of the partial beam 9 which attenuator may be controlled similarly to aperture diaphragm 55, assuring that photoresistor 21 is always charged with a constant radiation intensity. The color temperature is then read from the setting of this additional attenuator. Principally, this enables the output signal of the radiation-sensitive device to be indicated directly, i.e., without a bridge.

It is not necessary to automate the control of aperture 55 illustrated in FIGS. 1A and 1B. For simple and inexpensive measuring instruments a single bridge 25' may be provided, as shown in FIG. 1C for example, with a zero reading meter 37' to which bridge 25' may be selectively connected one of the photoresistors 21, 23 (if necessary with an additional balancing resistor) by means of, e.g., double-pole double-throw switch 42. In operation, this bridge is first connected to photoresistor 23, the aperture diaphragm 55 is adjusted until the bridge instrument indicates zero, then the bridge is switched to photoresistor 21 and again balanced to zero, the setting of the resistor 26' used for balancing then indicates the color temperature.

It is also possible to charge one and the same radiation-sensitive device consecutively with the light of the two wavelength ranges. In this, the simplest case, the device can then contain a lens, an attenuator, e.g., an aperture diaphragm, two narrowband color filters which can be selectively connected into the beam path (e.g., interference filters) and a photocell. The first color filter is then first brought into the beam path, the deflection of the measuring instrument connected to the radiation-sensitive device is then set to a certain reference value by means of the attenuator, and then, with the attenuator setting unchanged, the second color filter is placed in the beam path instead of the first color filter and the color temperature is read off from a correspondingly calibrated scale on the measuring instrument. Of the structural components shown in FIG. 1A, this simple instrument only contains the lens 3, the attenuator device 55, two filters, which may be brought selectively to the location of filter 13, the photoresistor 21 and the indicator device connected therewith.

Figure 4:
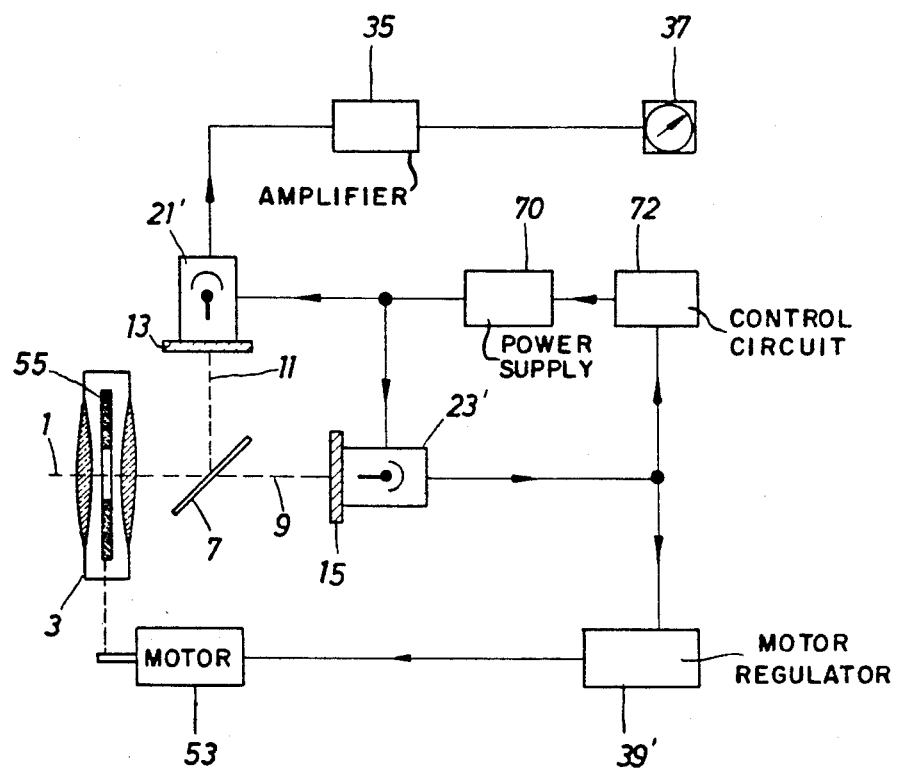
FIG. 4 is a schematic view of a modified embodiment of the present invention.

In the embodiment of the present invention shown in FIG. 4 the beam 1 emitted by the object being measured (not shown) falls through the adjustable aperture 55 which serves as the attenuator device onto a beam dividing device which may again comprise, e.g., a semipermeable mirror 7. The partial beams 9 and 11 produced by mirror 7 each fall onto a secondary electron multiplier 21' or 23', respectively, which multipliers are supplied with operating voltage by a controllable high-voltage unit 70. A color filter 13 or 15, respectively, is disposed in front of the multipliers 21' or 23', respectively, e.g., a narrowband interference filter which filters out the wavelength ranges for the color temperature measurement from the respective partial beams 9 or 11, respectively.

The output signal of multiplier 21' is amplified in an amplifier 35 and is fed into a measuring instrument 37 which indicates the desired color temperature.

The output signal of multiplier 23' is fed to a motor control device 39' which feeds a servomotor 53. The servomotor adjusts the aperture 55 in such a way that the intensity of the radiation passing through filter 15 into multiplier 23' is kept at least approximately constant.

As described, the device corresponds substantially to the embodiment according to FIG. 1.

In a further development of the present invention the output signal of multiplier 23' is additionally fed into a control circuit 72 which is connected with the high-voltage unit 70 and which influences the high voltage furnished by this unit 70 to multipliers 21' and 23' in such a manner that the output signal of multiplier 23' is kept constant, independent of changes in the intensity of the radiation received by multiplier 23', except for the error caused by the control deviation.

When it is intended to provide a simple and inexpensive servosystem 39', 53 to adjust aperture 55, it is difficult to realize control deviations which are less than 0.5 percent. Moreover, the time constant of the mechanical aperture regulation is relatively long; in the practical embodiment it is approximately 0.5 to 1 second. With the additional electrical regulation of the sensitivity of the secondary electron multipliers through control of the supply voltage by control circuit 72, the control deviation of the output signal of multiplier 23' becomes less than 0.1 percent. To compensate for the setting errors (control deviation) of the aperture, changes in voltage by approximately 1 percent is all that is required. With such slight changes in voltage the sensitivities of the two multipliers 21' and 23' change proportionally. It is thus possible to achieve an accuracy of the relative temperature measurement of approximately 1° K.

With electrical control of the sensitivity of the photoelectric measuring arrangement alone, such an accuracy can not be achieved; neither is this possible with mechanical aperture control alone. To compensate for the intensity changes occurring in practice in the radiation to be measured, the operating voltage of the multipliers would have to be changed by at least one order of magnitude. The nonlinearities of the multiplier characteristics, however, would then exert an adverse influence. The shortened response time achieved by electronic control would be lost since the sensitivity of the multipliers would not change until several minutes later with such high operating voltage changes.

In the photoelectric pyrometer according to FIG. 4, the full measuring accuracy is achieved after setting of aperture 55, i.e., after approximately 0.5 to 1 second. In the meantime, however, the control circuit 72 whose response time is less than a millisecond, maintains the output signal of multiplier 23' constant enough so that the instrument 37 can indicate fluctuations in temperature up to several 100 Hz. without losing too much measuring accuracy (at most 1 percent). Control contacts can thus be actuated practically without delay.

The regulation of the high-voltage input to the multipliers prevents high current use which would occur when the supply voltage collapses with high light intensities; thus the life, sensitivity and long term stability of the multipliers are enhanced.

Finally, the regulated power supply for feeding high voltage, which is usually necessary for the operation of the secondary electron multipliers, can be eliminated, since the control circuit 72 takes over its function.

The embodiment of FIG. 4 can also be modified in the same manner as was described in connection with the embodiment of FIGS. 1A, 2 and 3.

It will be understood that the above description of the present invention is susceptible to various modifications, changes and adaptations.

We claim:

1. An optical pyrometer for measuring the color temperature of a radiating body from the ratio or quotient of the intensity of two different wavelength ranges in a radiation beam emitted from a radiating body, comprising, in combination:
   a. optical means for receiving radiation from a radiation beam having an intensity and traveling along a path and for forming first and second partial beams having different wavelength ranges of the radiation;
   b. photoelectric means having sensitivity and responsive to said first and second partial beams for producing first and second output signals related to the intensity of radiation in said first and second partial beams, the output signals being a function of the radiated energy of said partial beams and the sensitivity of said photoelectric means.
   c. adjustable attenuating means arranged in the path of the radiation for adjusting the intensity of radiation in said partial beams while influencing the radiation in said first and second partial beams substantially to the same extent;
   d. first control means responsive to the first output signal for controlling the attenuating means for roughly maintaining said first output signal substantially constant;
   e. second control means connected to said photoelectric means and responsive to said first output signal for controlling the sensitivity of said photoelectric means for finely maintaining said first output signal substantially constant; and
   f. means for indicating the amplitude of the second output signal.

2. The pyrometer defined in claim 1 wherein said optical means has beam divider means for dividing the radiation beam into said first and second partial beams and filter means for determining the wavelength ranges of the partial beams.

3. The pyrometer defined in claim 2 wherein said attenuating means has a mechanically adjustable member, and said first control means has a servomotor coupled to adjust the member.

4. The pyrometer defined in claim 3 wherein said second control means has a substantially shorter time constant than said first control means.

5. The pyrometer defined in claim 4 wherein the control deviation of said second control means is less than the control deviation of said first control means.

6. The pyrometer defined in claim 5 wherein said filter means has a filter associated with a respective one of said photoresistors, and further comprising means for pivoting one of said photoresistors and its associated filter out of the path of the respective one of said partial beams, and an ocular into which the beams fall when the photoresistor is pivoted out of the way.

7. The pyrometer defined in claim 6 wherein said attenuating means is disposed between the radiating body and said beam divider means.

8. The pyrometer defined in claim 6 wherein said attenuating means includes two attenuating devices coupled to each other and disposed one in each of said partial beams.

9. The pyrometer defined in claim 6 wherein said beam divider means is a partially permeable mirror and two color filters.

10. The pyrometer defined in claim 9 wherein said second control means has a bridge circuit, said bridge circuit having one diagonal connected to a constant voltage source and the other diagonal coupled with said servomotor.

11. The pyrometer defined in claim 9 wherein said second control means has a bridge circuit and said photoelectric means has two photoresistors, said bridge circuit having a photoresistor as one arm, said photoresistor responding to the radiation intensity of one of the said partial beams, said bridge circuit containing in another arm an impedance which is adjustable by means of a setting device calibrated in color temperature degrees, one diagonal of said bridge being connected to an operating voltage source and the other diagonal being connected to a zero reading meter.

12. The pyrometer defined in claim 11 wherein said mechanically adjustable member has at least one aperture diaphragm.

13. The pyrometer defined in claim 11 wherein said mechanically adjustable member has at least one neutrally absorbing structural element.

14. The pyrometer defined in claim 6 wherein said photoelectric means is at least one secondary electron multiplier and said second control means control operating high voltage of said secondary electron multiplier.

15. A process for measuring the color temperature of radiating bodies from the ratio or quotient of the radiation energy in two different wavelength ranges of the radiation emitted by the radiator bodies, comprising the steps of:
   a. attenuating the intensity of a beam emitted by a radiating body to affect two predetermined different wavelength ranges substantially the same;
   b. maintaining one of the wavelength ranges at a predetermined constant intensity; and
   c. measuring the intensity of the other of the wavelength ranges to obtain a measured value of intensity which is a measure of the color temperature.